No. 848,044. PATENTED MAR. 26, 1907.
C. P. PATRICK.
BRACKET.
APPLICATION FILED OCT. 25, 1906.
2 SHEETS—SHEET 2.
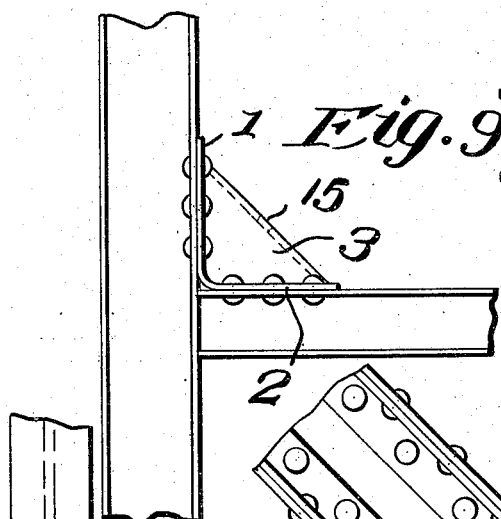
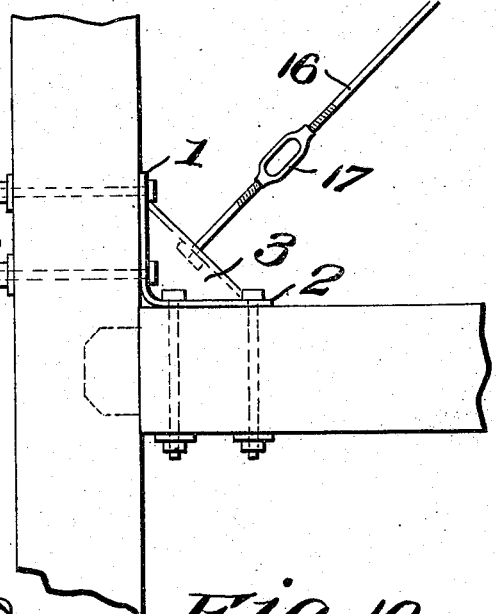
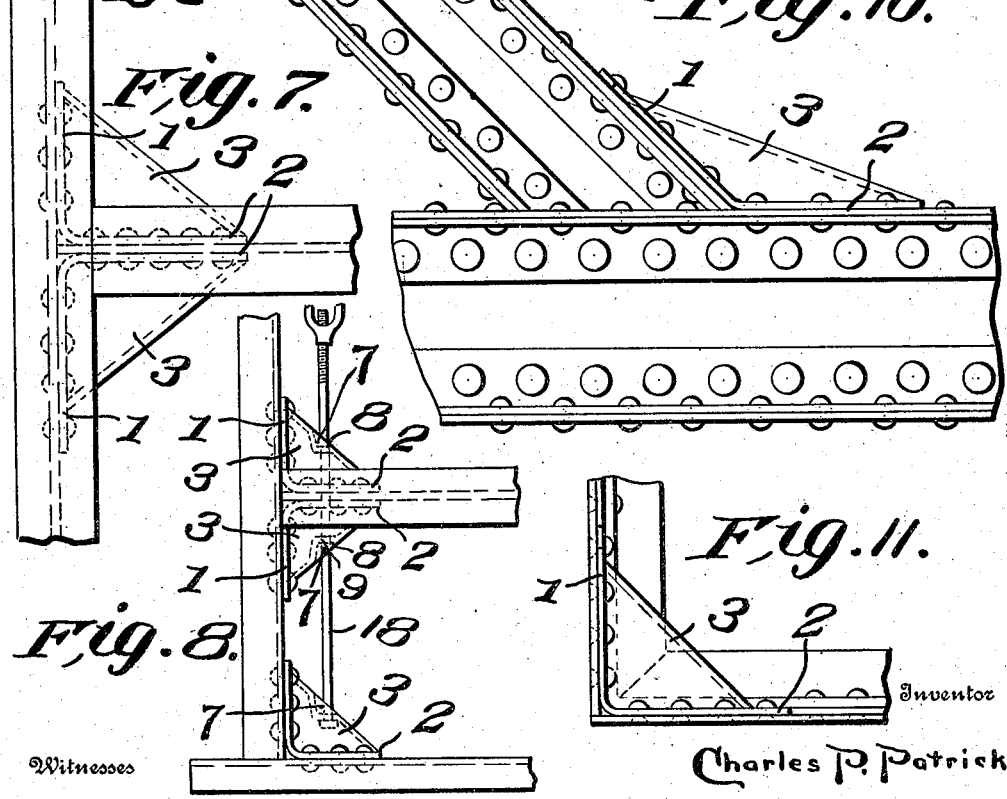
Witnesses
Inventor
Charles P. Patrick
By W. J. FitzGerald & Co.
Attorneys

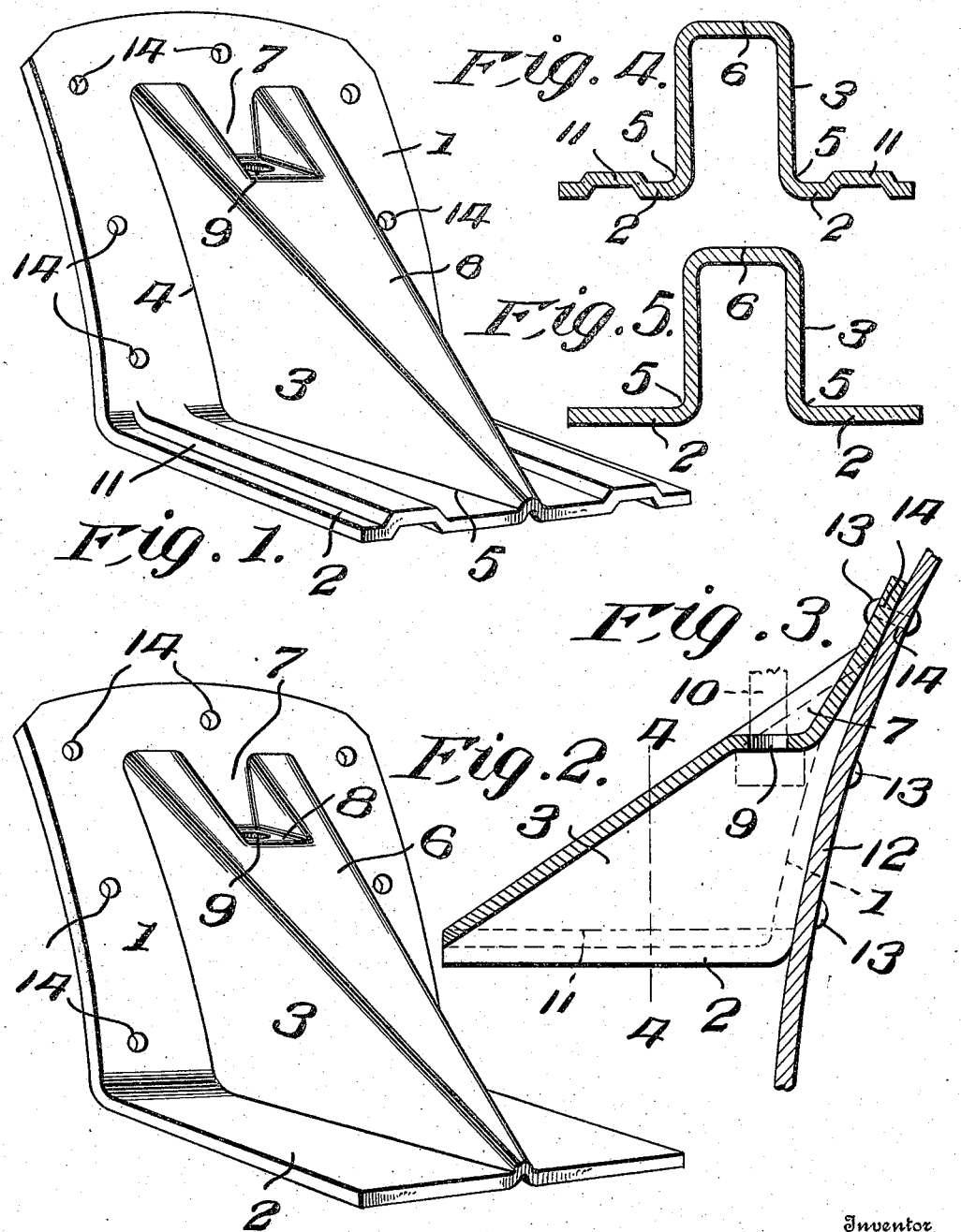

UNITED STATES PATENT OFFICE.

CHARLES P. PATRICK, OF BOONTON, NEW JERSEY.

BRACKET.

No. 848,044.    Specification of Letters Patent.   Patented March 26, 1907.

Application filed October 25, 1906. Serial No. 340,537.

*To all whom it may concern:*

Be it known that I, CHARLES P. PATRICK, a citizen of the United States, residing at Boonton, in the county of Morris and State of New Jersey, have invented certain new and useful Improvements in Brackets; and I do hereby declare the following to be a full, clear, and exact description of the invention, such as will enable others skilled in the art to which it appertains to make and use the same.

My invention relates to new and useful improvements in brackets, and more particularly to that class adapted to be used in connection with boilers, buildings, and structural work; and my object is to provide a bracket of this class which may be formed from pressed steel and utilized for various purposes, such as bracing corners of structural work, and one that may be employed for securing brace-rods or the like to any form of device.

Other objects and advantages will be hereinafter referred to and more particularly pointed out in the claims.

In the accompanying drawings, which are made a part of this application, Figure 1 is a perspective view of one form of bracket which is designed more particularly to be used in connection with boilers. Fig. 2 is a similar view of a slightly-modified form of bracket from that shown in Fig. 1. Fig. 3 is a central longitudinal sectional view of that form of bracket shown in Fig. 1. Fig. 4 is a transverse sectional view as seen from line 4 4, Fig. 3. Fig. 5 is a similar view of that form of bracket shown in Fig. 2. Fig. 6 is a side elevation of my improved bracket, showing the same as employed in connection with columns. Fig. 7 is a similar view showing the bracket used in connection with beams. Fig. 8 shows my improved bracket employed in connection with a locomotive-tank frame. Figs. 9 and 10 show my improved bracket as employed in connection with bridge and trestle work, and Fig. 11 is a view showing my improved bracket employed in connection with any suitable form of frame.

Referring to the drawings, in which similar reference-numerals designate corresponding parts throughout the several views, 1 and 2 indicate the wings, respectively, of my improved bracket, which are disposed at an angle to each other, the wing 1 forming the upright member of the bracket, while the wing 2 forms the horizontal portion thereof.

Formed integral with the outer faces of the wings 1 and 2 is a substantially conical brace-section 3, said brace-section being formed by pressing the metal forming the wings 1 and 2 outwardly, the base 4 of the conical brace-section 3 being formed upon the wing 1, while the apex 5 of the cone is formed upon the wing 2, the crown of the apex 5 being preferably coincident with the outer end of the wing 2. The face 6 of the brace-section 3 is directed inwardly at a point coincident with the base thereof to form a pocket 7, the floor 8 of the pocket 7 being provided with an opening 9, through which is adapted to be disposed any suitable form of bolt or brace-rod 10.

As best shown in Figs. 1 and 4 of the drawing, if desired the wing 2 may be provided with a plurality of ribs 11, said ribs being formed by striking up a portion of the wing, the object of said ribs being to reinforce the wing 2, and especially are the ribs applicable when the bracket is employed as a hanger.

That form of bracket shown in Figs. 1 to 5, inclusive, is adapted more particularly to be employed in connection with boilers or other similar devices, and for this reason the wing 1 of the bracket is shown as slightly curved to fit the contour of the boiler 12, the bracket being secured to the boiler by directing rivets 13 through openings 14 in the wing 1 and boiler-shell 12.

In Figs. 6 and 9 of the drawing the opening 9 is placed substantially midway between the base and apex of the brace-section 3, as shown at 15, the bracket herein shown being employed at the meeting-points of structural work and are to receive a brace-rod 16, one end of which is disposed through the opening 15, said brace-rod being provided with a turnbuckle 17, so that the same may be adjusted as desired.

In Fig. 8 of the drawing the pocket 7 is preferably disposed midway between the base and apex of the brace-section 3 instead of at the base-line thereof, with which is adapted to engage a rod 18, and the structure shown in Fig. 8 is employed in constructing tenders of engines and similar structures.

In Fig. 10 of the drawing the wings 1 and 2 are disposed at an obtuse angle to each other, this form of bracket being designed more particularly for use in connection with box-girders such as are employed in bridge and trestle work, and in Fig. 11 I have shown the bracket as employed in securing framework together, and preferably of that class of framework constructed of concrete or like plastic material.

It will now be seen that I have provided a very cheap form of bracket and yet one that is extremely durable, the conical brace member adding great rigidity to the bracket and at the same time providing a seat for the head of the brace-rod, the hollow in the brace member serving as a housing for the head of the bolt or brace-rod, thereby enabling the wings to be placed flush against the surface of the object to which the bracket is secured.

It will also be seen that by forming the bracket from a single piece of material and swaging the conical member and ribs from the surface of the same that said bracket can be used for a hanger as well as a bracket and that the wings of the bracket may be arranged at various angles to fit surfaces of varied degrees of pitch, and, as shown in Fig. 11, the bracket may be employed for bracing the corners of frames or the like formed from plastic material.

What I claim is—

1. A bracket of the class described formed of a single piece of metal comprising wings disposed at an angle to each other, and a substantially conical brace member formed on the surface of said wings the widest part of said brace being upon one wing and the narrowest part thereof on the opposite wing.

2. A bracket of the class described formed from a single piece of metal comprising wings disposed at an angle from each other, a brace-section formed by striking up a portion of said wings, the two sides and face of said brace converging to a point at one end, there being a pocket formed in said brace-section and means to reinforce said wings at each side of the brace-section.

3. A bracket of the class described comprising wings disposed at an angle to each other, a substantially conical brace-section formed by striking up a portion of said wings, there being a pocket formed in said brace-section, the floor of said pocket being substantially parallel with one of said wings, said floor having an opening therein to receive a bolt.

4. A bracket of the class described comprising wings, a hollow substantially conical brace-section integral with said wings, the side and upper walls of which are triangular in elevation, there being a pocket formed in the upper wall of said brace-section and having an opening therein to receive a bolt.

5. A bracket of the class described comprising angular wings, a brace-section integral with said wings, said brace-section being substantially rectangular in cross-section and having a pocket formed by depressing a portion of the face of said brace-section, the floor of which is in the same plane with one of said wings.

6. A bracket of the class described formed of a single piece of metal comprising angular wings, a tapered brace-section struck from the surface of said wings, there being a pocket formed at the base of said tapered brace-section, the floor surface of said pocket being at right angles to the surface of the wing containing the base of said brace-section, said floor having an opening therein to receive a bolt.

7. A bracket of the character described comprising angular wings, a hollow tapered brace-section integral with said wings, there being a pocket in the face of said brace-section, said pocket being substantially V-shaped in longitudinal section, and having an opening therein to receive a bolt.

In testimony whereof I have signed my name to this specification in the presence of two subscribing witnesses.

CHARLES P. PATRICK.

Witnesses:
S. H. De Brell,
Geo. P. Bard.